Sept. 24, 1935.    S. G. NORDENGREN    2,015,384
PROCESS FOR PREPARING SUPERPHOSPHATE
Filed June 27, 1934    2 Sheets-Sheet 1
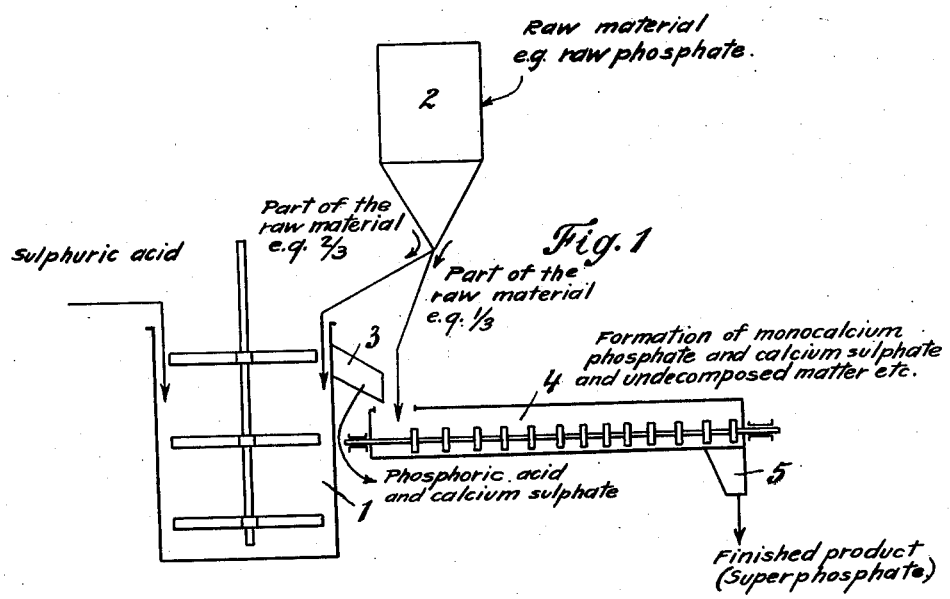
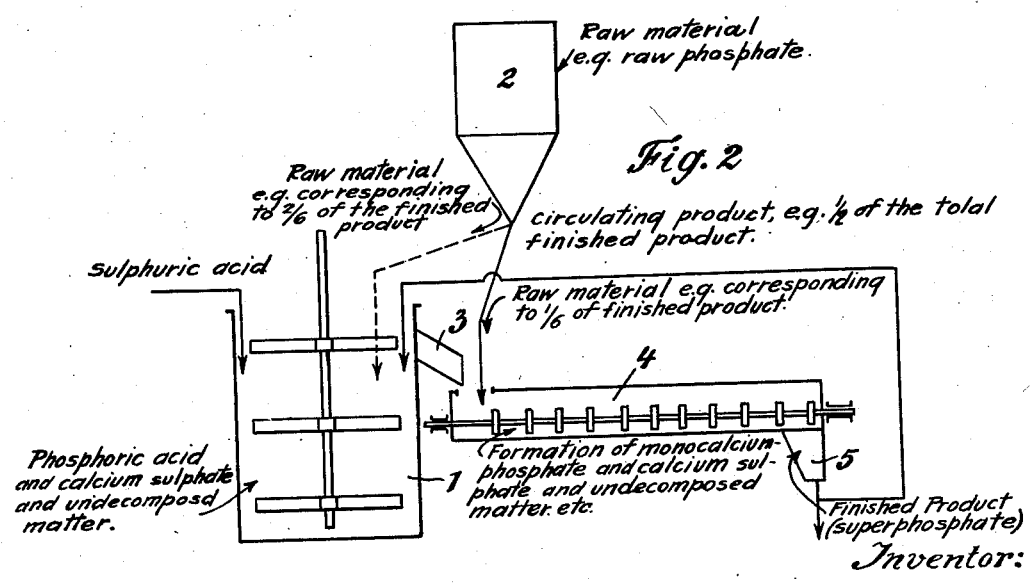
Inventor:
Sven Gunnar Nordengren
Attorney Sept. 24, 1935.   S. G. NORDENGREN   2,015,384
PROCESS FOR PREPARING SUPERPHOSPHATE
Filed June 27, 1934   2 Sheets-Sheet 2
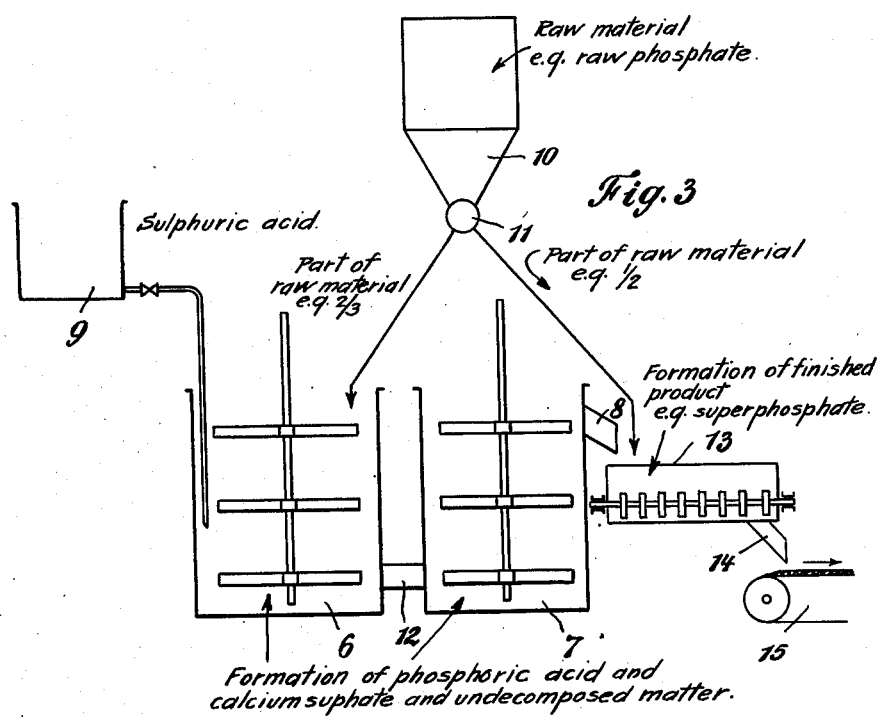
Inventor:
Sven Gunnar Nordengren
his Attorney.

Patented Sept. 24, 1935

2,015,384

UNITED STATES PATENT OFFICE 2,015,384

PROCESS FOR PREPARING SUPERPHOSPHATE

Sven Gunnar Nordengren, Landskrona, Sweden, assignor to Aktiebolaget Kemiska Patenter, Landskrona, Sweden Application June 27, 1934, Serial No. 732,559
In Sweden June 29, 1933

2 Claims. (Cl. 71—7)

This invention relates to a process for the manufacture of phosphoric acid-containing fertilizers.

If a raw phosphate is decomposed with sulphuric acid in order to prepare a water-soluble superphosphate therefrom, the reaction chiefly proceeds in accordance with the formula:

1. $Ca_3(PO_4)_2 + 2H_2SO_4 = 2CaSO_4 + CaH_4(PO_4)_2$

The tricalcium phosphate content of the raw phosphate is acted on by the sulphuric acid with the formation of monocalcium phosphate and calcium sulphate.

The above equation illustrating the reaction of sulphuric acid with tricalcium phosphate can be divided into two individual equations. According to the first equation the sulphuric acid reacts with a part of the tricalcium phosphate with the formation of calcium sulphate and phosphoric acid, as follows:

2. $2Ca_3(PO_4)_2 + 6H_2SO_4 = 6CaSO_4 + 4H_3PO_4$

The phosphoric acid so formed immediately reacts with further quantities of tricalcium phosphate with the formation of monocalcium phosphate as follows:

3. $Ca_3(PO_4)_2 + 4H_3PO_4 = 3CaH_4(PO_4)_2$

At the same time small quantities of dicalcium phosphate are formed. A small quantity of the tricalcium phosphate remains undissolved and the corresponding quantity of phosphoric acid (from reaction 2) remains behind in the product in the form of free phosphric acid. The sum of the two Equations 2 and 3, however, corresponds substantially to the course of the reaction taking place in the production of superphosphate (Equation 1).

In the production of double superphosphate, however, the decomposition reaction is divided into two parts, phosphoric acid and calcium sulphate being first produced, the latter separated and the resulting phosphoric acid employed for the decomposition of fresh quantities of raw phosphate.

The present invention makes use of this dividing of the reaction, without, however, complete separation of the calcium sulphate being effected as in the production of double superphosphate.

The advantages of dividing the reaction in this way are as follows:

The calcium sulphate and the monocalcium phosphate are each formed individually and not simultaneously, as is the case in the usual production of superphosphate. The first part, i. e. ⅔, of the tricalcium phosphate (reaction 2) are treated with a relatively larger quantity of sulphuric acid than in the usual production of superphosphate and the reaction, in which phosphoric acid is formed, therefore takes place in the presence of a larger quantity of liquid and may be carried out for a longer time, in certain circumstances even continuously, in a more or less flowing condition and with stirring.

It has been further found according to this invention that the reaction, in which the phosphoric acid with the calcium sulphate contained therein reacts with tricalcium phosphate, can take place very much more rapidly and that it is unexpectedly possible in this case considerably to shorten, or entirely to circumvent, the tedious hardening process, to which the ordinary superphosphate has to be subjected in decomposition chambers.

The process proceeds particularly advantageously if the tricalcium phosphate in the above reaction 2 is entirely or partially replaced by monocalcium phosphate, for example in the form of a previously prepared superphosphate. If the calcium sulphate content of the superphosphate is left out of consideration, the following equation will show the action of the sulphuric acid:

4. $2CaH_4(PO_4)_2 + 2H_2SO_4 = 2CaSO_4 + 4H_3PO_4$

The resulting phosphoric acid is then caused to react with fresh raw phosphate in accordance with the above Equation 3, again without separating the calcium sulphate:

5. $Ca_3(PO_4)_2 + 4H_3PO_4 = 3CaH_4(PO_4)_2$

The sum of these two reactions is the same as the initial Equation 1, viz:

6. $Ca_3(PO_4)_2 + 2H_2SO_4 = 2CaSO_4 + CaH_4(PO_4)_2$

This method of carrying the invention into effect yields a very dry and particularly well decomposed superphosphate.

According to this invention it has been found that reactions 2 and 4 may be carried out particularly easily in continuous operation, for example in containers provided with stirring means, since the reaction mass with the usual concentrations of sulphuric acid may be maintained liquid for several hours. The final decomposition obtained is better than in the case of the usual superphosphate production.

A further advantage of the invention is the fact that the mixture of phosphoric acid and calcium sulphate obtained, for example, according to Equation 4 or 2, on being mixed with raw phosphate according to Equation 3 or 5, sets almost immediately, i. e. directly after mixing or during cooling, to a solid product, which dries very rapidly. The presence of the calcium sulphate obviously has the effect that the drying proceeds substantially more rapidly than in the production of double superphosphate. It is therefore of importance for the success of the invention that this calcium sulphate should always be present in the mixture. This also applies to mixtures, in which, for example, a part of the calcium sulphate has been separated from the phosphoric acid, so that the quantity of calcium sulphate no longer entirely corresponds to the quantity of lime originally contained in the raw phosphate.

It has been found according to this invention that reactions 4 and 2 are most satisfactorily carried out in containers provided with stirring means, but that reaction 5 or 3 is with advantage carried out in a rapidly operating mixing screw device. The product discharging from the apparatus may be cooled down in a manner known per se either in a chamber or on a continuously travelling conveyor belt. The entire process can in this way be carried out absolutely continuously. In the method of carrying out the process of this invention, using reactions 4 and 6 raw phosphate and sulphuric acid are, for example, continuously introduced as originated materials and a certain quantity of the finished, monocalcium phosphate-containing product is allowed to circulate in the process itself. In this case the quantity of monocalcium phosphate returned may be less than the quantity equivalent to the sulphuric acid, but it is advantageous to return a quantity of monocalcium phosphate which is at least equivalent to the sulphuric acid. It may even be more advantageous to allow a larger quantity of monocalcium phosphate to circulate as finished product than is equivalent to the sulphuric acid (see Equation 4). The decomposition according to the process of the present invention may further be with advantage carried out in the presence of other substances, such as compounds containing potash or nitrogen.

According to a particular embodiment of the invention the operation may also be carried out in such a way that in the first stage the phosphoric acid-containing raw material is brought into reaction substantially only with phosphoric acid, preferably in such a way that the raw material is introduced into the upper part of the decomposition container and the sulphuric acid into the lower part.

If the phosphoric acid-containing raw material, for example raw phosphate, in the first stage comes into reaction substantially only with the phosphoric acid, a soluble phosphate is intermediately formed, for example monocalcium phosphate, which can then in turn be subsequently converted with the decomposition acid, for example sulphuric acid, into phosphoric acid. By this method of operation the decomposition action and the quality of the end product can be still further improved.

Such a method of operation can be readily carried out, for example in the production of superphosphate, by introducing the sulphuric acid into the decomposition container of the first stage at a more or less considerable distance below the surface of the mass, but the phosphate at the top. In this way the phosphoric acid is first formed in the lower layers. In the upper layers, however, the phosphate first enters into reaction only with phosphoric acid and forms a soluble phosphate, for example monocalcium phosphate. Towards the bottom on the other hand the phosphoric acid or phosphoric acid and sulphuric acid content of the mixture increases.

The accompanying drawings illustrate diagrammatically a few examples of apparatus suitable for carrying out the process of the present invention.

In the accompanying drawings Fig. 1 illustrates diagrammatically one form of apparatus. The first stage of the process, viz. the reaction, in which the phosphoric acid is formed, takes place in a container 1, in which the first part of the phosphate from container 2 and the entire decomposition sulphuric acid is introduced. The mixture of phosphoric acid and calcium sulphate here formed flows from the container 1 over an overflow 3 into a mixing apparatus 4. Here the second stage of the decomposition takes place, the second portion of the phosphate from the container 2 being introduced. The final decomposition product (superphosphate) is thus formed in the mixing apparatus 4, and leaves the same at an outlet 5 in a more or less solid or plastic condition.

Fig. 2 illustrates diagrammatically the same process with the difference that the formation of the mixture of phosphoric acid and calcium sulphate takes place in the container 1 by introducing a portion of the decomposition product, i. e. the finished superphosphate, into the container 1 where it is mixed with the whole of the decomposition acid. Phosphoric acid and calcium sulphate are formed from the monocalcium phosphate of the returned decomposition product. The calcium sulphate contained therein remains unaltered in the mixture. The entire mixture passes over the overflow 3 into the mixing apparatus 4, into which the quantity of raw phosphate 40 is introduced from the container 2, which is stoichiometrically equivalent to the decomposition acid employed for the production of superphosphate. After mixing has been effected, the finished product discharges from the outlet 5 of the mixing apparatus in a more or less solid or plastic condition.

A further modification of a procedure employing the same apparatus (Fig. 2) consists in that a portion of the raw phosphate, which is necessary for the production of superphosphate, is introduced from the container 2 simultaneously with returned decomposition product into the container 1 and is here first decomposed to phosphoric acid and calcium sulphate, after which the remainder of the phosphate in the form of powder is introduced into the mixing apparatus 4 for the purpose of producing the end product (cf. in this connection the dotted line in the flow sheet II from the container 2 to the container 1).

In Fig. 3 an apparatus is shown, which illustrates an embodiment of the decomposition apparatus of the above type in greater detail. The decomposition apparatus for the first stage consists in this case of two communicating vessels 6 and 7, of which the latter is provided with an overflow 8. The sulphuric acid employed for the decomposition is introduced from the container 9 into the decomposition vessel 6, the introduction taking place in accordance with the above described method of operating in the lower part of the vessel 6. A part of the raw phosphate is introduced from the container 10 through a distribution device 11 to the container 6, where the raw phosphate reacts with the ascending phosphoric acid to form monocalcium phosphate, sinks and is further converted by the sulphuric acid introduced to phosphoric acid and calcium sulphate. The mass passes through the connecting tube 12 into the container 7, where the decomposition proceeds further. The paste passes by way of the overflow 8 into the mixing apparatus 13, where the residual portion of the phosphate flows in from the distributing device 11. Intensive mixing takes place and the product leaves the mixing apparatus 13 at 14 in a more or less solid condition. The product is slowly conveyed on the conveyor belt 15, which preferably travels inside a deaerating chamber, at such a rate that it can be thrown off or cut up at the end thereof and be forwarded to the place of storage. The above described method of decomposition can of course also be carried out by returning a part of the end product to the container 6, into which in certain circumstances a part of the phosphate can also be introduced.

I claim:—

1. The process of preparing superphosphate which comprises mixing phosphate rock with sulphuric acid in such proportions and under such conditions as to convert the entire $P_2O_5$ content of the phosphate rock into free phosphoric acid and thereupon mixing the resulting unseparated reaction products containing phosphoric acid and calcium sulphate with phosphate rock in amount sufficient to react with the phosphoric acid to produce monocalcium phosphate and yield a final product containing calcium sulphate and monocalcium phosphate in the ratio found in superphosphate.

2. The process of preparing superphosphate which comprises continuously agitating and mixing phosphate rock with sulphuric acid in such proportions and under such conditions as to convert the entire $P_2O$ content of the phosphate rock into free phosphoric acid and thereupon continuously agitating and mixing the resulting unseparated reaction products containing phosphoric acid and calcium sulphate with phosphate rock in amount sufficient to react with the phosphoric acid to produce monocalcium phosphate and yield a final product containing calcium sulphate and monocalcium phosphate in the ratio found in superphosphate and effecting said mixing of the phosphate rock with sulphuric acid and said mixing of the resulting unseparated reaction products with phosphate rock in at least two mixing devices.

SVEN GUNNAR NORDENGREN.